United States Patent
Inaoka et al.

(10) Patent No.: US 12,311,751 B2
(45) Date of Patent: May 27, 2025

(54) TANK AND METHOD OF MANUFACTURING A TANK

(71) Applicant: Kubota Corporation, Osaka (JP)

(72) Inventors: Masaki Inaoka, Sakai (JP); Ryohei Sumiyoshi, Sakai (JP); Shogo Kajii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 459 days.

(21) Appl. No.: 17/751,665

(22) Filed: May 24, 2022

(65) Prior Publication Data

US 2022/0410699 A1 Dec. 29, 2022

(30) Foreign Application Priority Data

Jun. 24, 2021 (JP) .................................. 2021-104793

(51) Int. Cl.
*B60K 15/03* (2006.01)
*B65D 25/40* (2006.01)
*B65D 25/42* (2006.01)

(52) U.S. Cl.
CPC ........ *B60K 15/03177* (2013.01); *B65D 25/40* (2013.01); *B65D 25/42* (2013.01);
(Continued)

(58) Field of Classification Search
CPC ... B65D 25/42; B65D 25/40; B60K 15/03177
See application file for complete search history.

(56) References Cited

U.S. PATENT DOCUMENTS

| 5,366,257 A | * | 11/1994 | McPherson | ............. F16L 47/32 285/392 |
| 8,636,163 B2 | | 1/2014 | Gebert et al. | |

(Continued)

FOREIGN PATENT DOCUMENTS

| JP | 58-029957 U | 2/1983 |
| JP | 62-020922 U | 2/1987 |

(Continued)

OTHER PUBLICATIONS

Japanese Office Action for corresponding JP Application No. 2021-104793, Jan. 9, 2024 (w/ machine translation).

(Continued)

*Primary Examiner* — Nathan J Jenness
*Assistant Examiner* — Jennifer Castriotta
(74) *Attorney, Agent, or Firm* — MORI & WARD, LLP

(57) ABSTRACT

A tank includes a tank body made of a thermoplastic resin, a female screw member and a joint that are made of metal, and a seal member. The tank body has a tubular connection port with a through hole, and an inner space communicating with the connection port. The joint has a male screw portion to be screwed into a female screw hole of the female screw member, a boss portion connected to the male screw portion, and a joint through hole passing through the male screw portion and the boss portion. The seal member is provided so as to contact the boss portion and the hole side surface when the male screw portion is screwed into the female screw hole. The boss portion is contactable with a first bearing surface of the female screw member.

20 Claims, 16 Drawing Sheets

(52) U.S. Cl.
CPC .............. *B60K 2015/03453* (2013.01); *B60Y 2200/411* (2013.01)

(56) References Cited

U.S. PATENT DOCUMENTS

| | | | |
|---|---|---|---|
| 2002/0096880 A1* | 7/2002 | Schulz | G01F 15/18 |
| | | | 285/133.11 |
| 2003/0209905 A1 | 11/2003 | Pachciarz et al. | |
| 2004/0239112 A1* | 12/2004 | Kertesz | B82Y 30/00 |
| | | | 285/423 |
| 2010/0032436 A1 | 2/2010 | Gebert et al. | |
| 2015/0239339 A1 | 8/2015 | Nakamura | |
| 2017/0313820 A1* | 11/2017 | Choi | C08J 5/00 |
| 2019/0092413 A1 | 3/2019 | Tabuchi et al. | |

FOREIGN PATENT DOCUMENTS

| | | |
|---|---|---|
| JP | 02-111508 | 4/1990 |
| JP | 05-012893 U | 2/1993 |
| JP | 05-318622 | 12/1993 |
| JP | 2008-183967 | 8/2008 |
| JP | 2011-529820 | 12/2011 |
| JP | 2014-088053 | 5/2014 |
| JP | 2019-064322 | 4/2019 |

OTHER PUBLICATIONS

Japanese Decision to Grant a Patent for corresponding JP Application No. 2021-104793, Jan. 30, 2024 (w/ machine translation).

* cited by examiner

FIG. 4
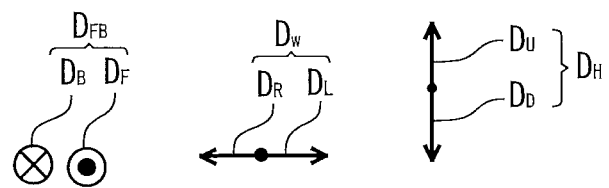
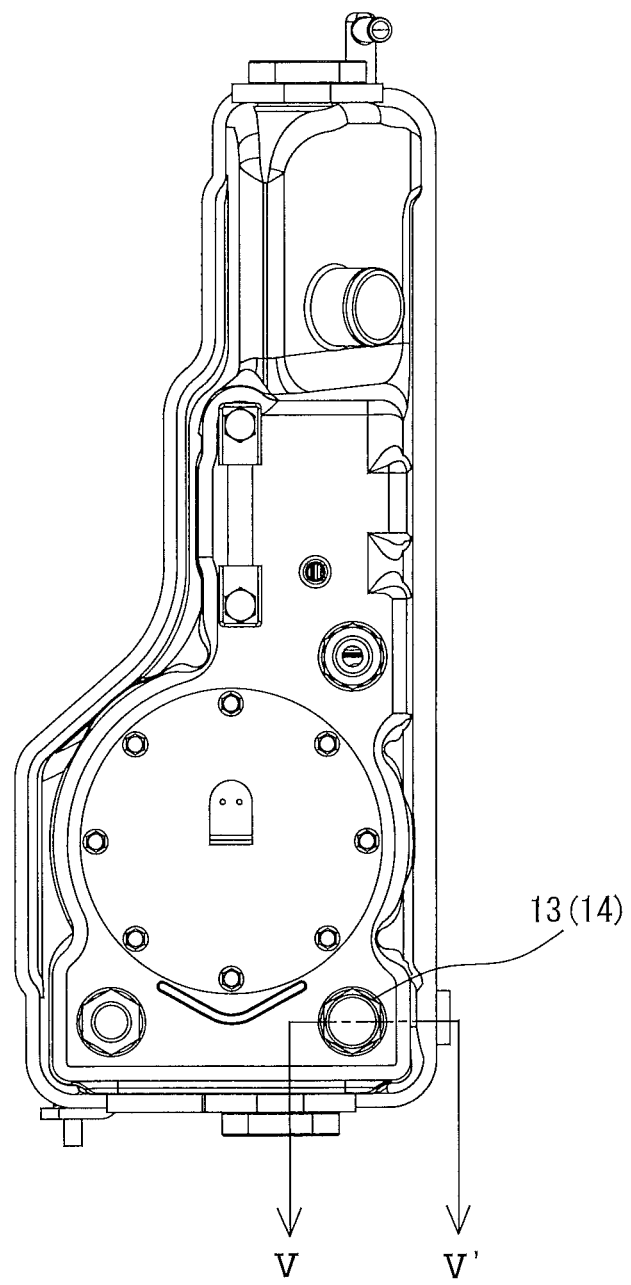

FIG. 7
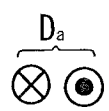
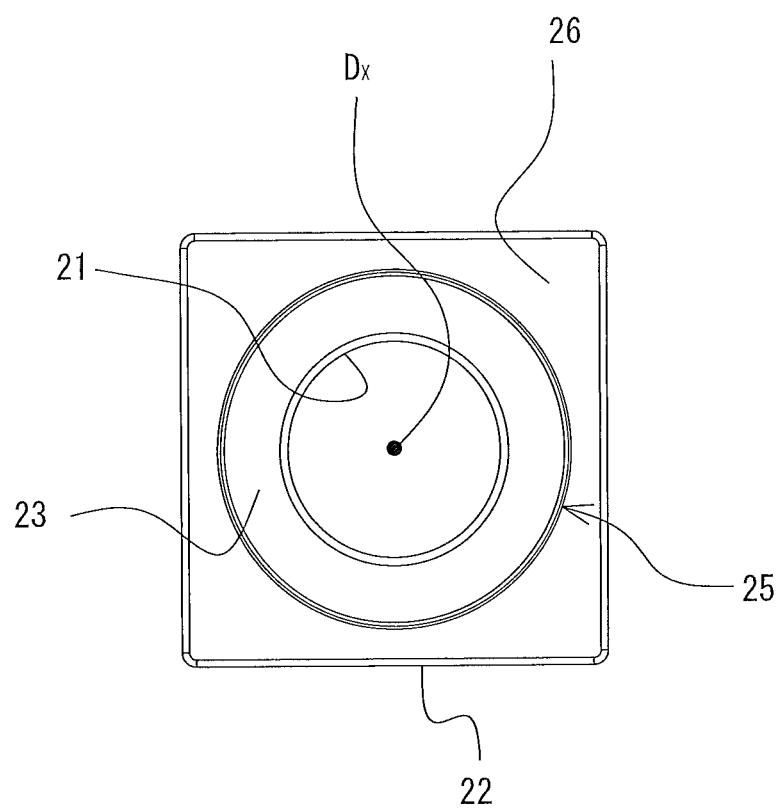

FIG. 8
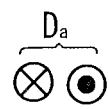
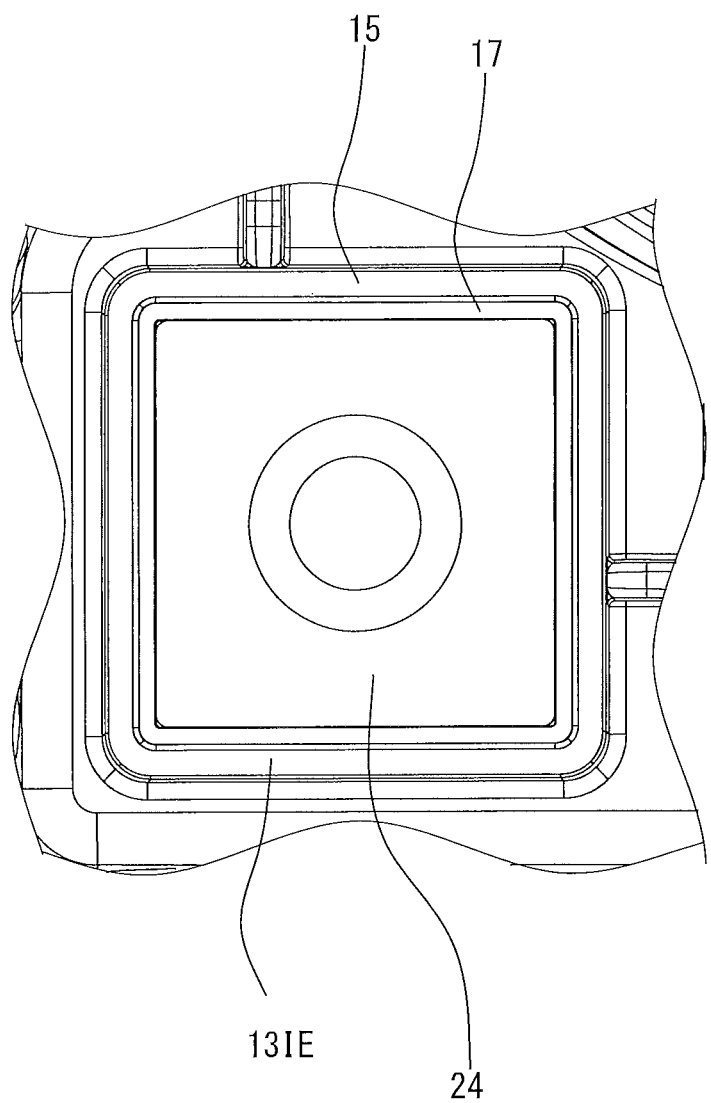

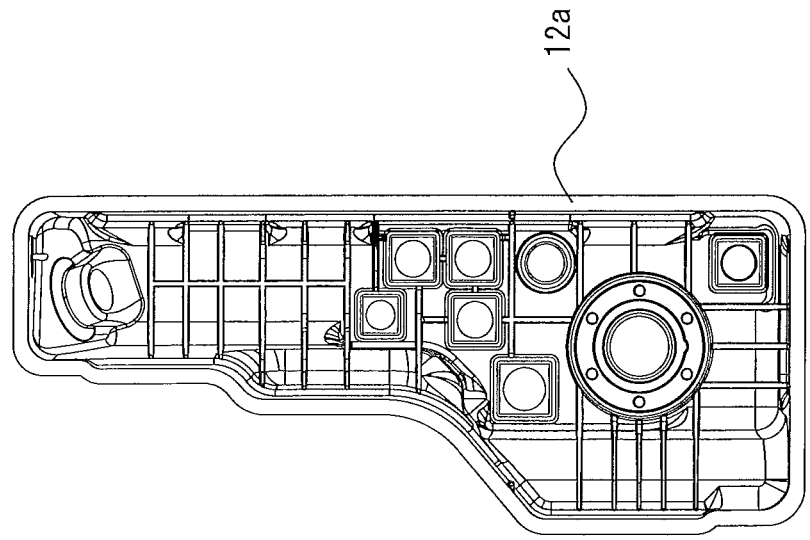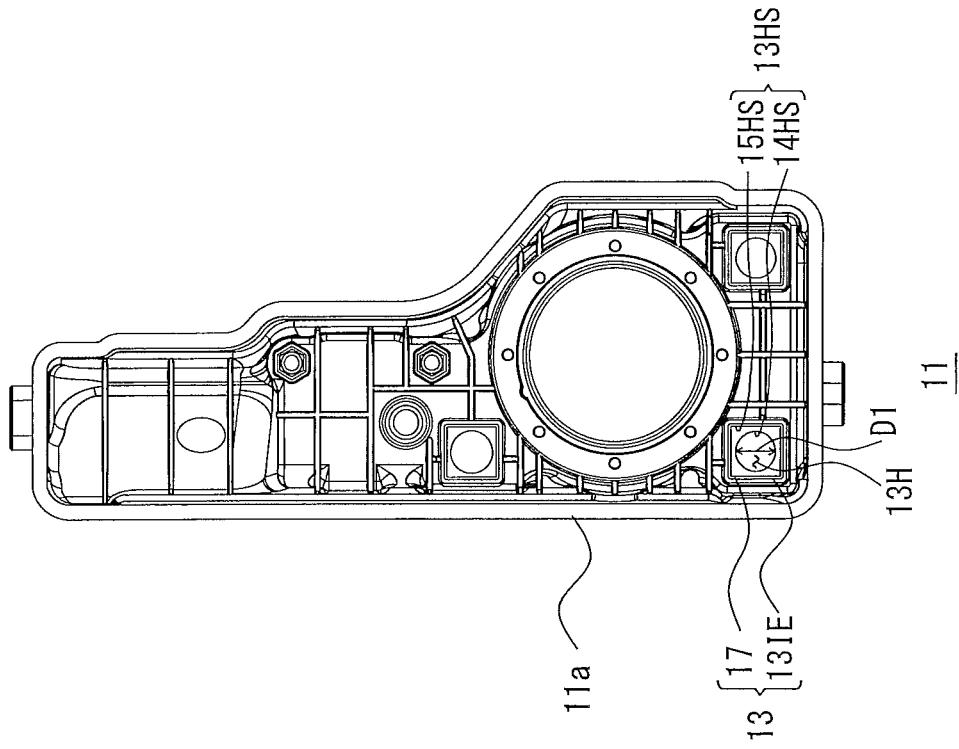
FIG. 13

TANK AND METHOD OF MANUFACTURING A TANK

CROSS-REFERENCE TO RELATED APPLICATIONS

The present application claims priority under 35 U.S.C. § 119 to Japanese Patent Application No. 2021-104793, filed Jun. 24, 2021. The contents of this application are incorporated herein by reference in their entirety.

BACKGROUND OF THE INVENTION

Field of the Invention

The present invention relates to a tank and a method of manufacturing the same.

Discussion of the Background

U.S. Pat. No. 8,636,163 shows a fuel tank of a vehicle made of thermoplastic resin. The tank is provided with a joint made of metal for connecting to an external oil supply hole portion (filler neck).

SUMMARY OF THE INVENTION

According to the one aspect of the present disclosure, a tank includes a tank body made of a thermoplastic resin, a female screw member made of metal, a joint made of metal, and a seal member. A tank body has a connection port having a tubular shape with a through hole, and an inner space communicating with the connection port. A female screw member has a first inner side surface defining a female screw hole, a first outer side surface opposite to the first inner side surface in a radial direction with respect to a center axis of the female screw hole, and a first bearing surface provided between the first inner side surface and the first outer side surface in the radial direction, wherein the first outer side surface is configured to contact a hole side surface defining a through hole. The joint has a male screw portion to be screwed into a female screw hole, a boss portion connected to the male screw portion, and a joint through hole which passes through the male screw portion and a boss portion. The seal member is provided so as to contact the boss portion and the hole side surface when the male screw portion is screwed into the female screw hole. The boss portion is contactable with the first bearing surface when the male screw portion is screwed into the female screw hole.

According to another aspect of the present disclosure, a method of manufacturing a tank for a work vehicle includes molding a first member made of a thermoplastic resin including a connection port having a tubular shape with a through hole extending in a first direction and having a first length of a diameter; providing a female screw member having a first inner side surface defining a female screw hole, a first outer side surface opposite to the first inner side surface in a radial direction with respect to the center axis of the female screw hole, a first bearing surface provided between the first inner side surface and the first outer side surface in the radial direction, and a second bearing surface connecting the first inner side surface and the first outer side surface opposite to the first bearing surface; press-fitting the female screw member into the connection port so that the first outer side surface comes into contact with the hole side surface defining the through hole before the first member is cooled; providing a second member made of a thermoplastic resin having a periphery corresponding to the periphery of the first member; connecting the circumference of the first member and the circumference of the second member to generate a tank body having an inner space to store liquid, the inner space being surrounded by the first member and the second member; providing a joint and a seal member, the joint having a male screw portion to be screwed into the female screw hole, a boss portion connected to the male screw portion, and a joint through hole passing through the male screw portion and the boss portion, an outer diameter of the male screw portion being a second length smaller than the first length, an outer diameter of the boss portion being a third length larger than the second length and smaller than the first length; and screwing the male screw portion into the female screw hole to contact the seal member with the boss portion and the hole side surface.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

FIG. 4 is a front view of the tank.
FIG. 7 is a front view of the female screw member.
FIG. 8 is a view showing the vicinity of the female screw member and the internal projection when viewed in the direction along the center axis from the inside to the outside of the tank body when the locking member is removed.
FIG. 13 is a view of the joint surface of the first member and the joint surface of the second member as viewed in the axial direction.

DESCRIPTION OF THE EMBODIMENTS

Figure 1:
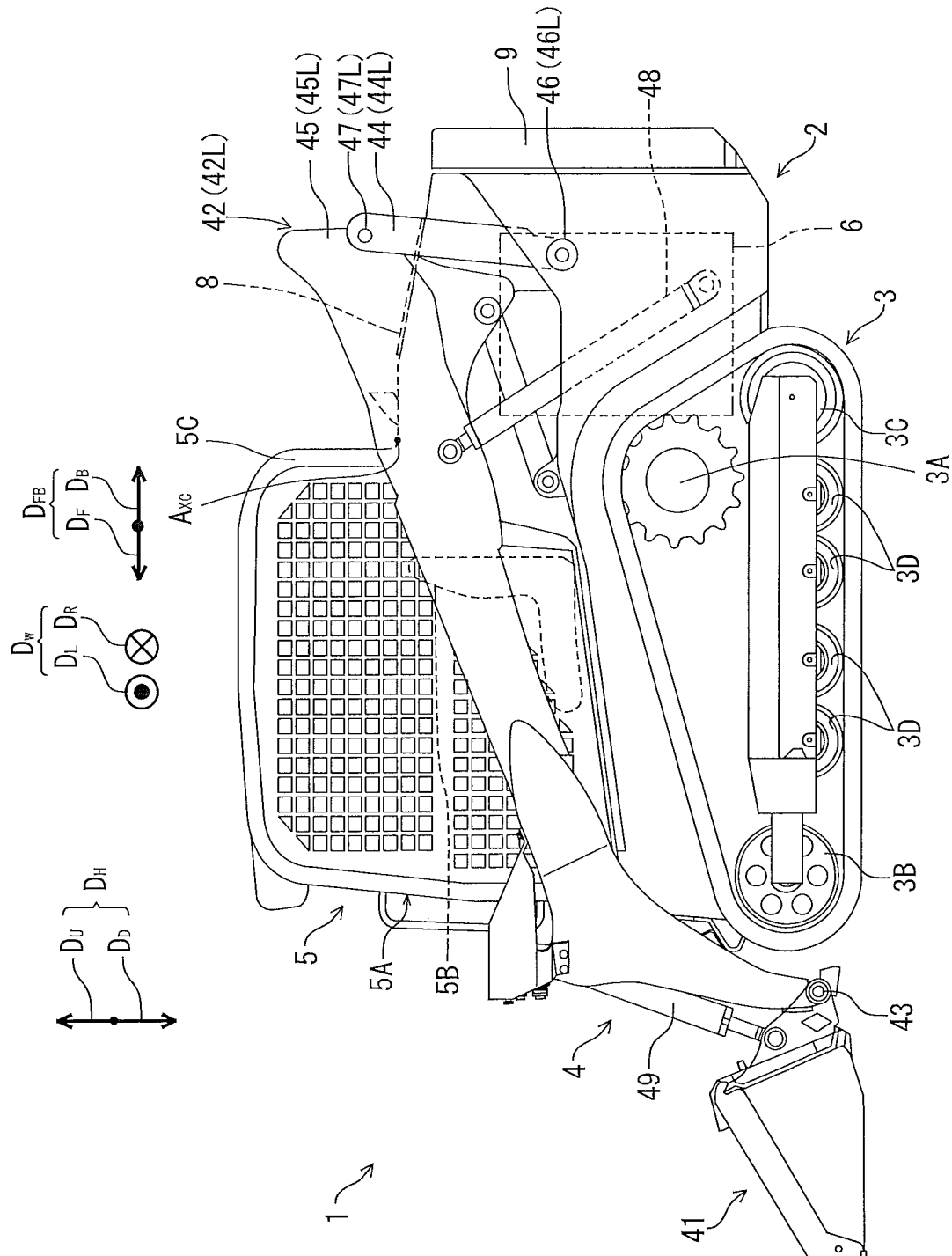
FIG. 1 is a side view of a work vehicle.

Hereinafter, the present invention will be described in detail with reference to drawings showing embodiments thereof. In the drawings, the same reference numerals indicate corresponding or substantially identical configurations.

Figure 2:
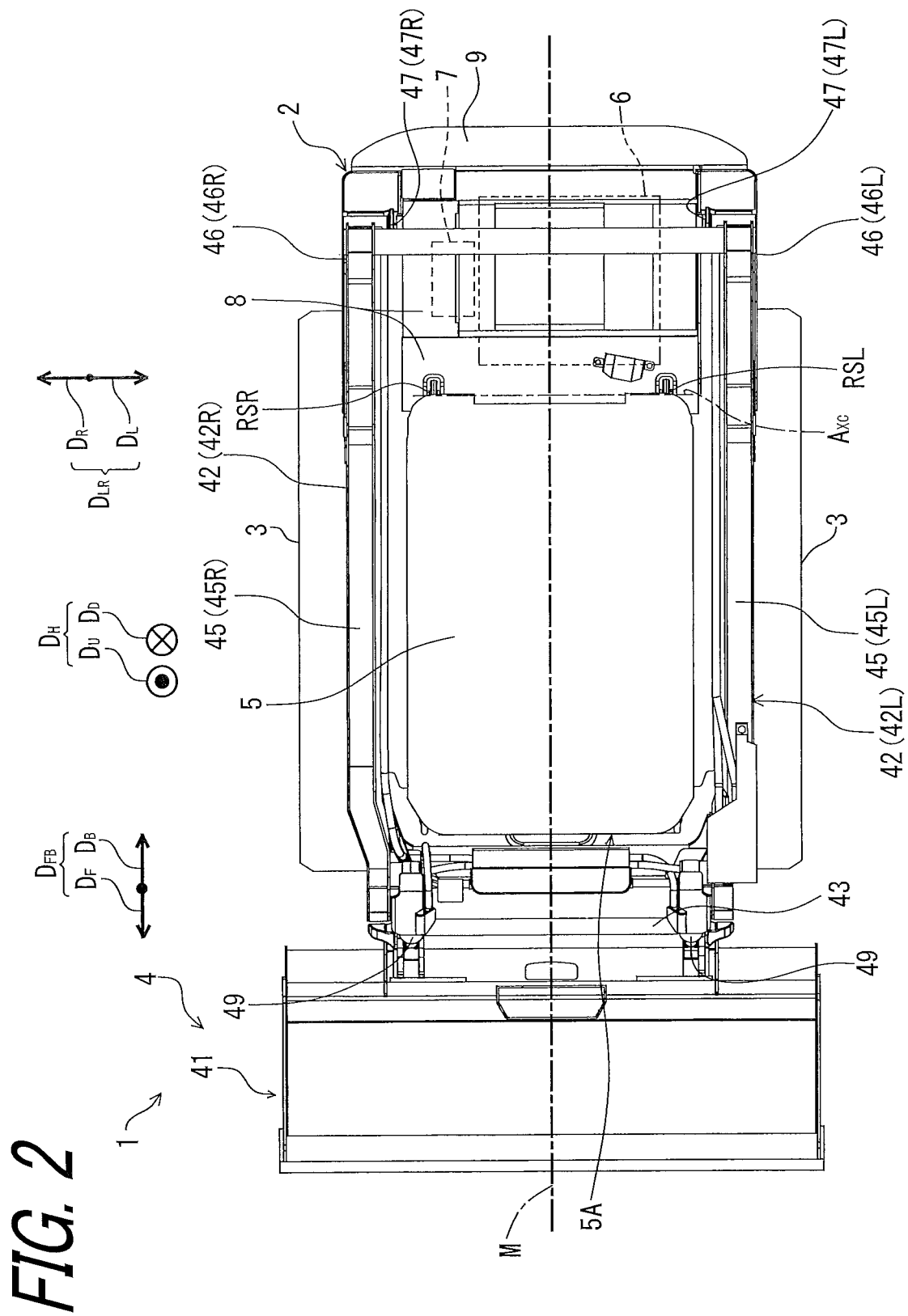
FIG. 2 is a top view of a work vehicle.

Referring to FIGS. 1 and 2, a work vehicle 1, for example, a compact truck loader, includes a vehicle body frame 2, a traveling device 3, a work device 4, and a cabin 5. The vehicle body frame 2 supports the traveling device 3, the work device 4, and the cabin 5. In the illustrated embodiment, the traveling device 3 is a crawler type traveling device. Therefore, the traveling device 3 includes the drive wheels 3A, the driven wheels 3B and 3C, and the rolling wheels 3D. However, the traveling device 3 is not limited to a crawler type traveling device. The traveling device 3 may be, for example, a front wheel/rear wheel traveling device, or a traveling device having a front wheel and a rear crawler. Work device 4 includes work implement (bucket) 41 at the distal end of work device 4. A proximal end of the work device 4 is attached to a rear portion of the vehicle body frame 2. The work device 4 includes a pair of arm assemblies 42 for rotatably supporting the bucket 41 via the bucket pivot shaft 43. A pair of arm assemblies 42 has a lift link 44 and an arm 45 respectively.

The lift link 44 is rotatable with respect to the vehicle body frame 2 around the fulcrum shaft 46. The arm 45 is rotatable with respect to the lift link 44 about the joint shaft 47. Work device 4 further includes a plurality of arm cylinders 48 and at least one work implement cylinder 49. Each of the plurality of arm cylinders 48 is rotatably connected to the vehicle body frame 2 and the arm 45, and moves the lift link 44 and the arm 45 to raise and lower the bucket 41. At least one work implement cylinder 49 is configured to tilt the bucket 41. The cabin 5 is attached to a front portion of the vehicle body frame 2. A work vehicle 1 is provided with a window 5A in front of a cabin 5, and a driver's seat 5B and an operating device (not illustrated) in the cabin 5. The cabin frame 5C shown in FIG. 1 and defining the outer shell of the cabin 5 is rotatable about rotational shafts RSL and RSR on the vehicle body frame 2 shown in FIG. 2. FIGS. 1 and 2 shows a common rotational axis AXC defined by rotational axes RSL and RSR.

In the embodiment according to the present application, the longitudinal direction $D_{FB}$ (forward $D_F$/rearward $D_B$) means a front-rear direction as seen from an operator seated on the driver's seat 5B of the cabin 5. Left direction $D_L$, Right direction $D_R$, $D_W$ width direction mean, as viewed from the operator, left direction, right direction, and left/right direction, respectively. Up direction $D_U$, down direction $D_D$; height direction $D_H$ mean, as viewed from the operator, an upward direction, a downward direction and a height direction. Front/back, left/right (width), and up/down (height) directions of the work vehicle 1 correspond to the front/back, left/right (width), and up/down (height) directions as viewed from the operator.

FIG. 1 shows the left side of the work vehicle 1. As shown in FIG. 2, the vehicle body frame 2 is substantially symmetrical with respect to the vehicle body center plane M, and among the pair of arm assemblies 42 with respect to the vehicle body center plane M of the arm assembly 42 provided on the left side is shown as a first arm assembly 42L, and the arm assembly 42 provided on the right side with respect to the vehicle body center plane M is shown as a second arm assembly 42R. A lift link 44 provided on the left side with respect to the vehicle body center plane M is shown as a first lift link 44L. An arm 45 provided on the left side with respect to the vehicle body center plane M is shown as a first arm 45L, and an arm 45 provided on the right side with respect to the vehicle body center plane M is shown as a second arm 45R. A fulcrum shaft 46 located on the left side of the vehicle body center plane M is shown as the first fulcrum shaft 46L, a fulcrum shaft 46 provided on the right side of the vehicle body center plane M is shown as the second fulcrum shaft 46R. A joint shaft 47 provided on the left side with respect to the vehicle body center plane M is shown as a first joint shaft 47L, and a joint shaft 47 provided on the right side with respect to the vehicle body center plane M is shown as a second joint shaft 47R.

Referring to FIGS. 1 and 2, the work vehicle 1 further includes an engine 6 provided at a rear portion of the vehicle body frame 2. The engine 6 is configured to provide driving force to the traveling device 3 and the work device 4. The engine 6 is provided between a pair of arm assemblies 42 in the width direction $D_W$ of the work vehicle 1. The work vehicle 1 is further provided with a cover 8 for covering the engine 6. The work vehicle 1 further includes a bonnet cover 9 provided at the rear end of the vehicle body frame 2. Bonnet cover 9 is openable and closable and a maintenance worker can perform maintenance work on the engine 6 and the like.

Figure 3:
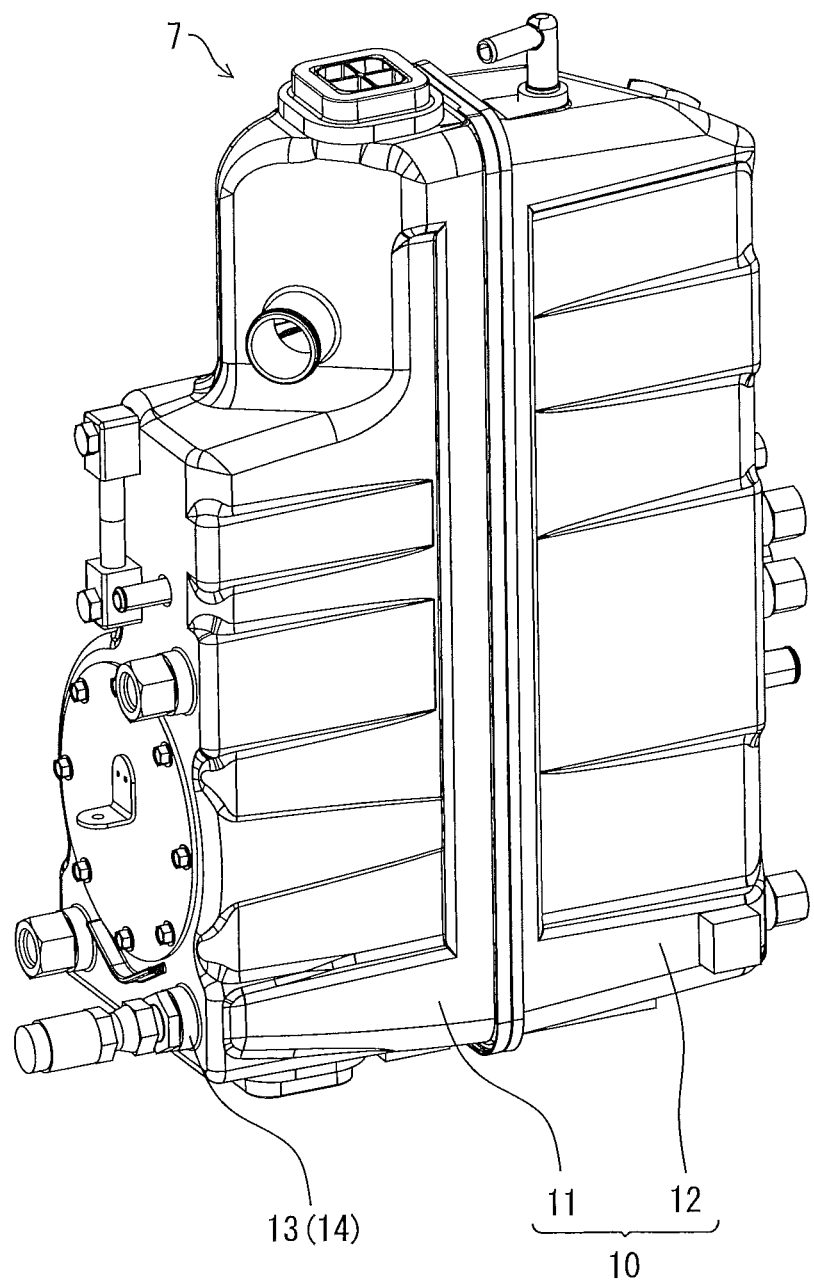
FIG. 3 is an overall perspective view of the tank.
Figure 5:
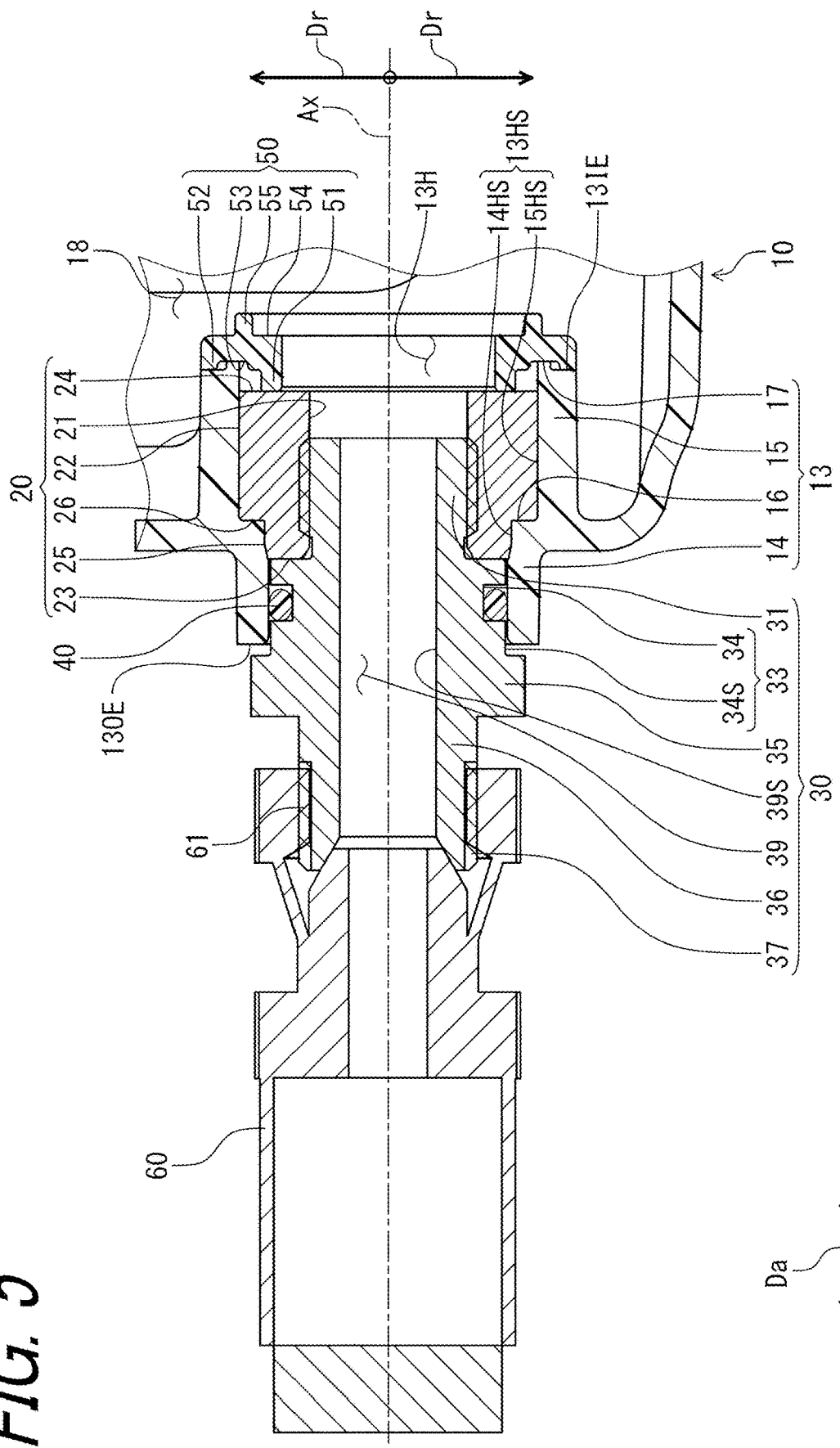
FIG. 5 is a partial cross-sectional view of the tank in section V-V' of FIG. 4.

A work vehicle 1 is provided with a tank 7 on the left side of an engine 6. Specifically, the tank 7 is a hydraulic oil tank, but may be a urea water tank or a fuel tank. The tank 7 stores hydraulic fluid to be supplied to a plurality of arm cylinders 48 and at least one work implement cylinder 49. FIG. 3 is an overall perspective view of the tank 7, FIG. 4 is a front view of the tank 7, and FIG. 5 is a partial cross-sectional view of the tank 7 taken along the V-V' section of FIG. 4. Referring to FIGS. 3 to 5, the tank 7 includes a tank body 10, a female screw member 20, a joint 30, a seal member 40, and a locking member 50. The locking member 50 may be omitted.

The tank body 10 is made of a thermoplastic resin. More specifically, the tank body 10 is made of nylon with tempered glass. Referring to FIG. 3, the tank body 10 includes first member 11 and second member 12. Referring to FIG. 5, the tank body 10 includes a tubular connection port (13) having a through hole 13H, and an inner space 18 communicating with the through hole 13H and storing liquid. The connection port 13 includes an external projection 14 projecting toward the outside of the tank body 10 and an internal projection 15 projecting into the inner space 18. In other words, the connection port 13 has a first end 13IE facing the inner space 18 and a second end 13OE facing the outside of the tank body 10 and opposite to the first end 13IE. Since the size of the opening of the external projection 14 is different from that of the opening of the internal projection 15, a step 16 is provided between the external projection 14 and the internal projection 15. The opening of the external projection 14 is formed by the hole side surface 14HS. The opening of the internal projection 15 is formed by the hole side surface 15HS.

Figure 6:
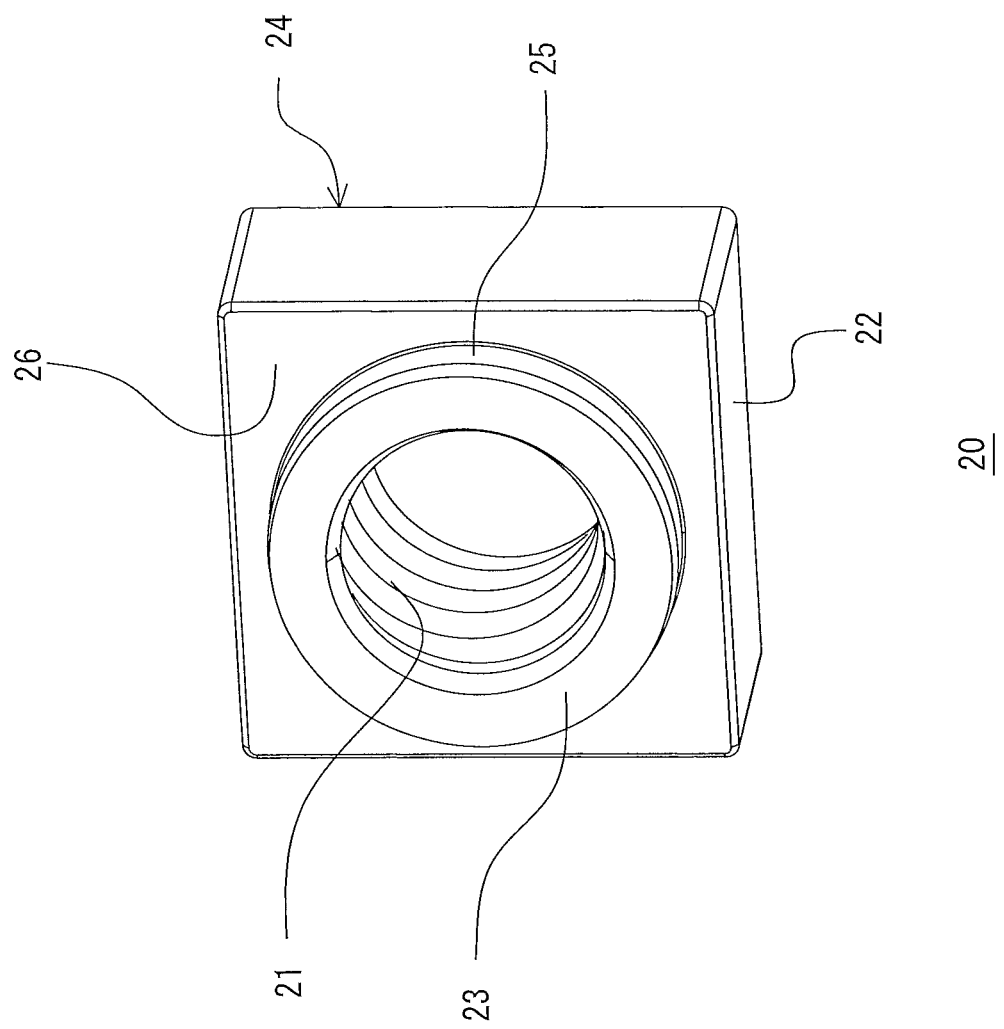
FIG. 6 is a perspective view of the female screw member.

FIG. 6 is a perspective view of the female screw member 20, and FIG. 7 is a front view of the female screw member 20. The female screw member 20 is provided closer to the first end 13IE than to the second end 13OE. Female screw member 20 is made of a metal. Specifically, the female screw member 20 may be made of a known metal such as stainless steel or iron. Referring to FIGS. 5-7, the female screw member 20 has a first inner surface 21, a first outer surface 22, a first bearing surface 23, a second bearing surface 24, an additional outer surface 25, and a third bearing surface 26. A female screw hole is formed in the first inner surface 21. The male screw portion 31 of the joint 30 is screwed into the female screw hole 61. The center axis Ax of the female screw hole is along the direction of entry of the male screw portion 31 when the male screw portion 31 is screwed into the female screw hole 61. The first outer surface 22 is provided opposite to the first inner surface 21 in the radial direction Dr with respect to the center axis Ax of the female screw hole 61. The first bearing surface 23 is provided between the first inner surface 21 and the first outer surface 22 in the radial direction Dr. The second bearing surface 24 connects the first inner surface 21 and the first outer surface 22 on the side opposite to the first bearing surface 23 in a axial direction Da along the center axis Ax. The third bearing surface 26 extends in the radial direction Dr and connects the first outer surface 22 and the additional outer surface 25. The additional outer surface 25 extends in the axial direction Da and connects the first bearing surface 23 and the third bearing surface 26. The third bearing surface 26 contacts the step 16 in the axial direction Da. The additional outer surface 25 contacts the hole side surface 13HS defining the through hole 13H. More specifically, the additional outer surface 25 contacts the hole side surface 14HS defining the through hole 13H in the internal projection 15.

FIG. 8 is a view showing the vicinity of the female screw member 20 and the internal projection 15 when viewed from the inside to the outside of the tank body 10 along the center axis Ax when the locking member 50 is removed. Referring to FIGS. 5 and 8, the first outer surface 22 includes the through hole 13H contacts the hole side surface 13HS defining the through hole 13H. More specifically, the first outer surface 22 contacts the hole side surface 15HS defining the through hole 13H in the internal projection 15. As a result, the through hole 13H extends in an axial direction Da along the center axis Ax. As shown in FIGS. 7 and 8, when viewed in the axial direction Da, the outer periphery of the female screw member 20 (first outer surface 22) has the shape of a square. Therefore, even if the male screw portion 31 of the joint 30 is screwed into the first inner surface 21, the female screw member 20 is prevented from being rotated together. The shape of the outer periphery of the female screw member 20 (first outer surface 22) is not limited to a square shape, but may be a polygon shape. Even with such a shape, it is possible to prevent the female screw member 20 from being rotated together. Among the polygons, a triangle or a square shape is preferable in the sense that the female screw member 20 can be easily reduced in size.

Figure 9:
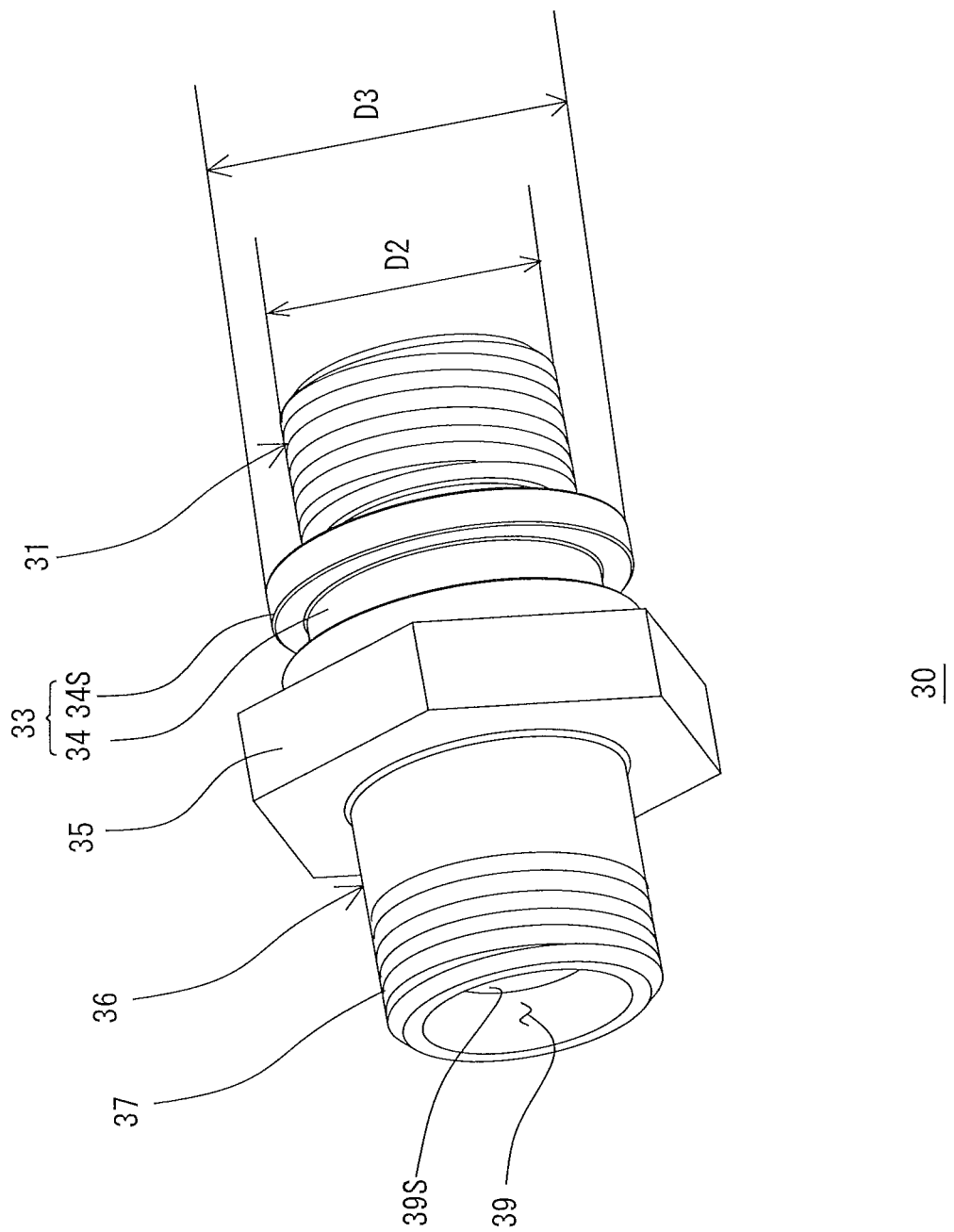
FIG. 9 is a perspective view of the joint.

FIG. 9 is a perspective view of the joint 30. Referring to FIGS. 5 and 9, the joint 30 includes a male screw portion 31, a boss portion 33, a head portion 35, a hose connection 36, and a joint through hole 39. The joint 30 is made of metal. In particular, the joint 30 may be made of a known metal such as stainless steel or iron. The male screw portion 31 is formed so as to be screwed into a female screw hole formed in the first inner surface 21. The boss portion 33 is connected to the male screw portion 31. The outer diameter D3 of the boss portion 33 in the radial direction Dr is longer than the outer diameter D2 of the male screw portion 31 in the radial direction Dr. The diameter D1 (see FIG. 13) in the radial direction Dr of the through hole 13H between the female screw member 20 and the boss portion 33 is longer than the outer diameter D3 of the boss portion 33. Therefore, the boss portion 33 can contact the first bearing surface 23 when the male screw portion 31 is screwed into the female screw hole 61.

Head portion 35 is provided opposite to the male screw portion 31 with respect to the boss portion 33 in the axial direction Da. As shown in FIG. 9, when seen in the axial direction Da, the outer periphery of the head portion 35 has a regular hexagonal shape and is formed so as to be easily fastened with a tool such as a spanner. For convenience of mounting, the outer diameter of the head portion 35 in the radial direction Dr is preferably longer than the outer diameter of the boss portion 33. The hose connection 36 is provided opposite to the male screw portion 31 in the axial direction Da. The hose connection 36 has a generally cylindrical shape. In FIGS. 5 and 9, the hose connection 36 is provided at an end portion of the joint 30, but may be provided inside the head portion 35. The hose connection 36 is configured to be connected to the hose 60. In particular, the hose connection 36 has an additional male screw portion 37 into which the female screw hole 61 of the hose 60 is screwed. The shape of the hose 60 is not limited to that shown in FIG. 5, and may be another shape.

The joint through hole 39 passes through the male screw portion 31, the boss portion 33, the head portion 35 and the hose connection 36. The joint through hole 39 is formed by the second inner surface 39S. The joint 30 through hole 39 extends in the axial direction Da. The joint through hole 39 forms a passage of the liquid flowing out from the tank 7 and flowing into the tank 7. The boss portion 33 has a retaining groove 34 on a second outer surface 34S opposite to the second inner surface 39S defining the joint through hole 39. The outer shape of the boss portion 33 has a cylindrical shape except for the retaining groove 34.

The retaining groove 34 is provided with a seal member 40. The seal member 40 is, for example, an O-ring. The seal member 40 is provided so as to contact the boss portion 33 and the hole side surface 13HS when the male screw portion 31 is screwed into the female screw hole described above. More specifically, since the seal member 40 is closer to the second end 13OE than to the first end 13IE, the seal member 40 is provided so as to contact the boss portion 33 and the hole side surface 14HS defining the through hole 13H in the external projection 14 when the male screw portion 31 is screwed into the female screw hole 61. Therefore, oil leakage from the hole side surface 13HS and the second outer surface 34S is suppressed.

Figure 10:
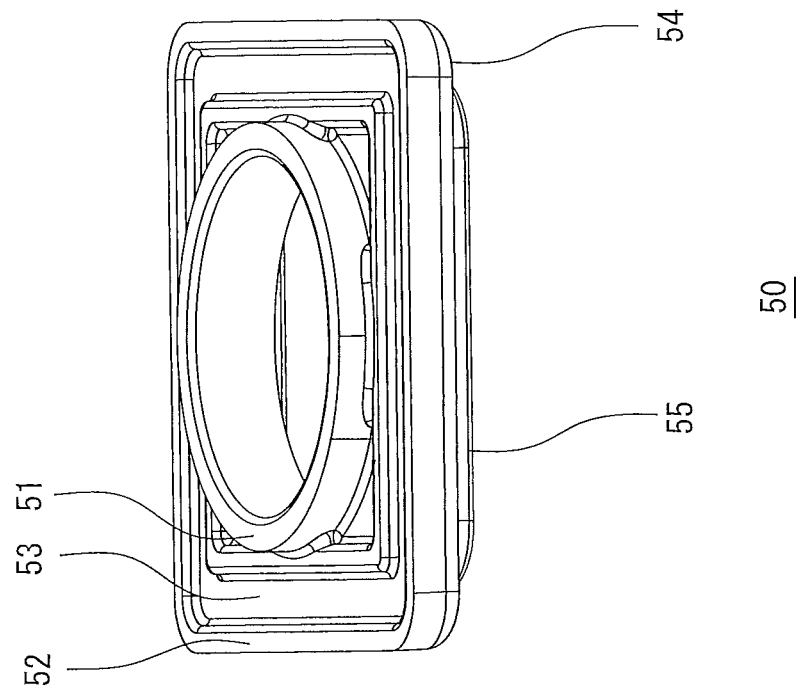
FIG. 10 is a perspective view of a locking member.
Figure 11:
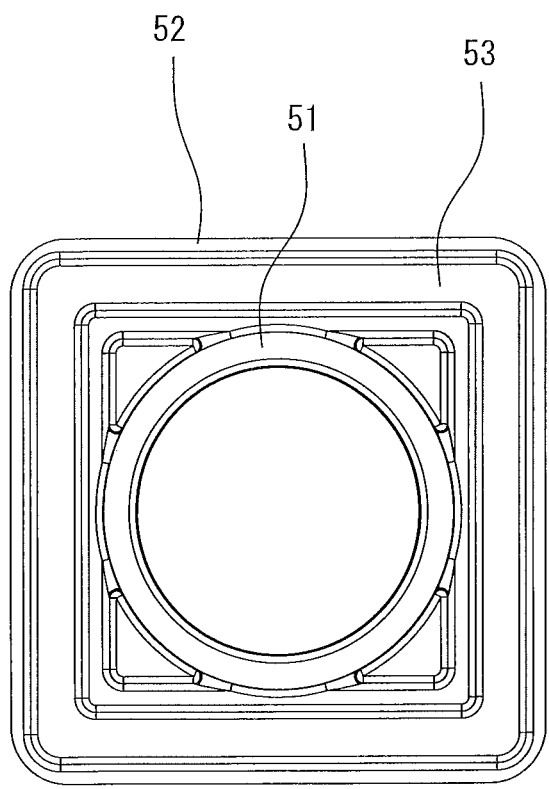
FIG. 11 is a front view of the locking member.
Figure 12:
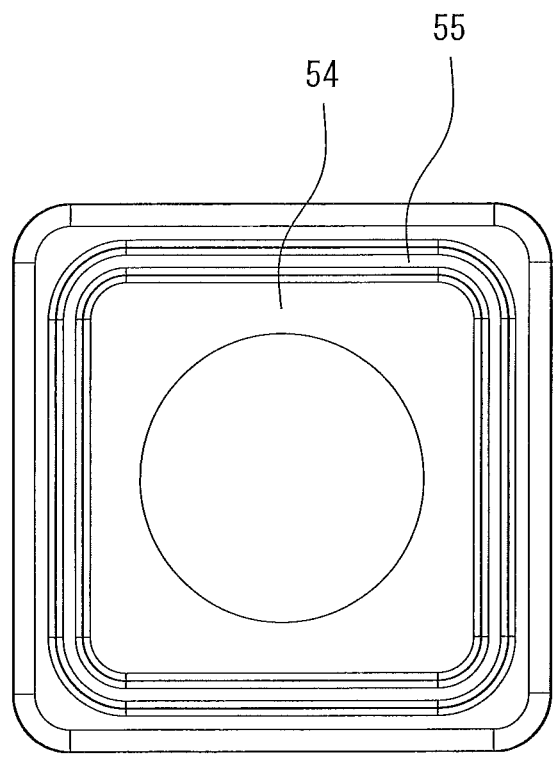
FIG. 12 is a rear view of the locking member.

The locking member 50 is connected to the connection port 13. The locking member 50 is in contact with the second bearing surface 24. FIG. 10 is a perspective view of the locking member 50. FIG. 11 is a front view of the locking member 50. FIG. 12 is a rear view of the locking member 50. Referring to FIG. 5 and FIGS. 10 to 12, the locking member 50 includes a first contact portion 51, a second contact portion 52, a groove portion 53, a back surface portion 54 and a back surface projection 55. The locking member 50 is made of a thermoplastic resin. The locking member 50 is preferably made of the same material as that of the tank body 10.

The first contact portion 51 is configured to contact with the second bearing surface 24 of the female screw member 20. The first contact portion 51 has a substantially cylindrical shape. The second contact portion 52 is configured to contact the first end 13IE of the connection port 13. More specifically, the outer shape of the second contact portion 52 has a substantially square shape. As shown in FIG. 5, the first contact portion 51 projects in the axial direction Da more than the second contact portion 52. The groove portion 53 is a recess formed between the first contact portion 51 and the second contact portion 52. The groove portion 53 is connected to a projecting portion 17 projecting from the first end 13IE of the connection port 13. The projecting portion 17 and the groove portion 53 are coupled by vibration welding, and the first end 13IE of the connection port 13 and the first contact portion 51 come into contact with each other to prevent the welded resin from leaking into the inner space 18.

The back surface portion 54 is provided opposite to the first contact portion 51, the second contact portion 52, and the groove portion 53. The outer shape of the back surface portion 54 has a substantially square shape. The back surface projection 55 projects from the back surface portion 54 in the axial direction Da. The outer shape of the back surface projection 55 is substantially square.

Next, a method of manufacturing a tank 7 according to the present embodiment will be described. As described above, the tank body 10 is formed by joining the first member 11 and the second member 12. FIG. 13 is a view showing the joint surface of the first member 11 and the joint surface of the second member 12 as viewed in the axial direction Da. As shown in FIG. 13, the first member 11 has a joint surface 11a and the second member 12 has a joint surface 12a. The shape of the joint surface 11a corresponds to the shape of the joint surface 11a. The joint surface 11a forms the outer periphery of the first member 11 when viewed in the axial direction Da. The joint surface 12a forms the outer periphery of the second member 12 when viewed in the axial direction Da.

Figure 14:
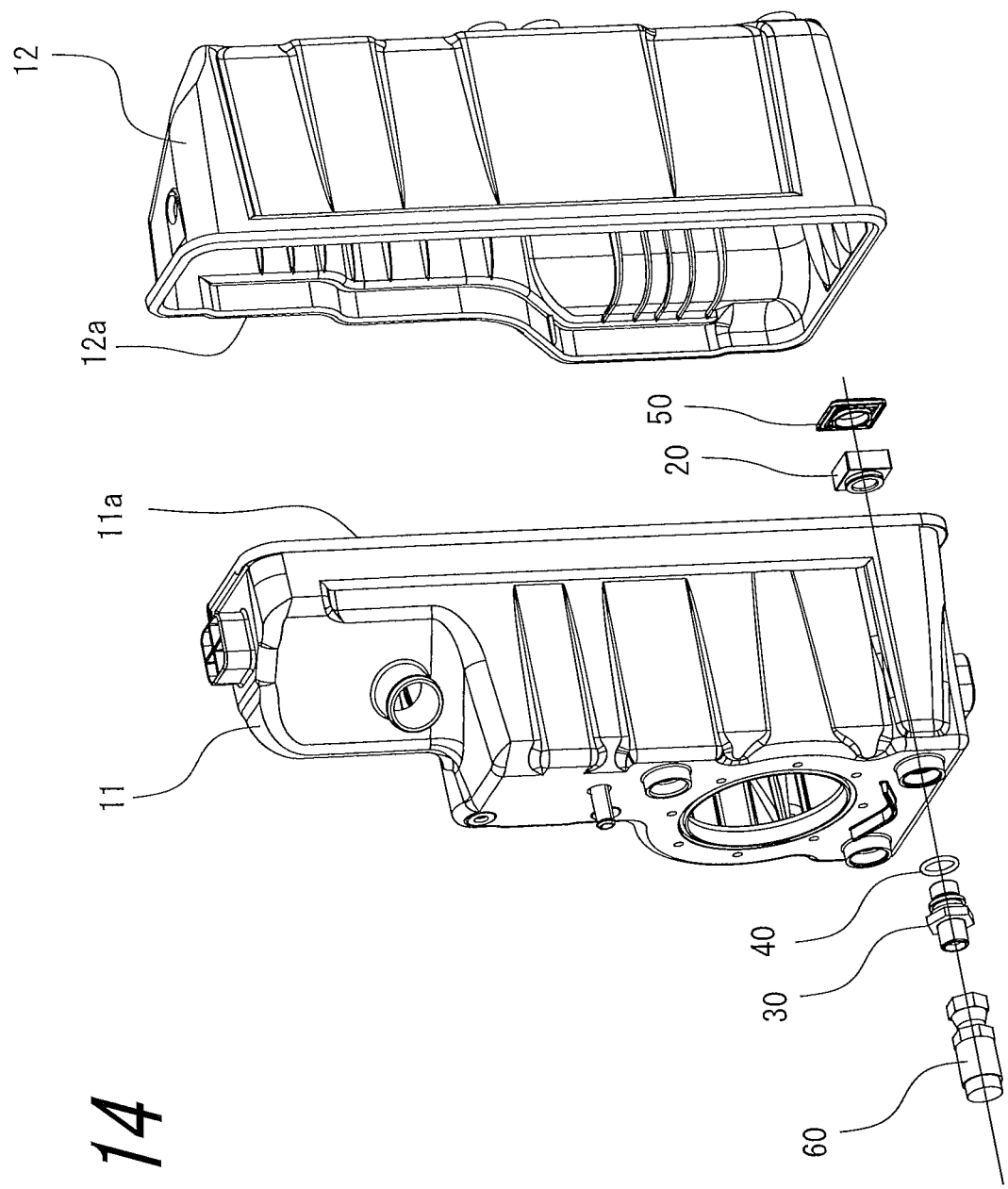
FIG. 14 is a developed view of the tank.
Figure 15:
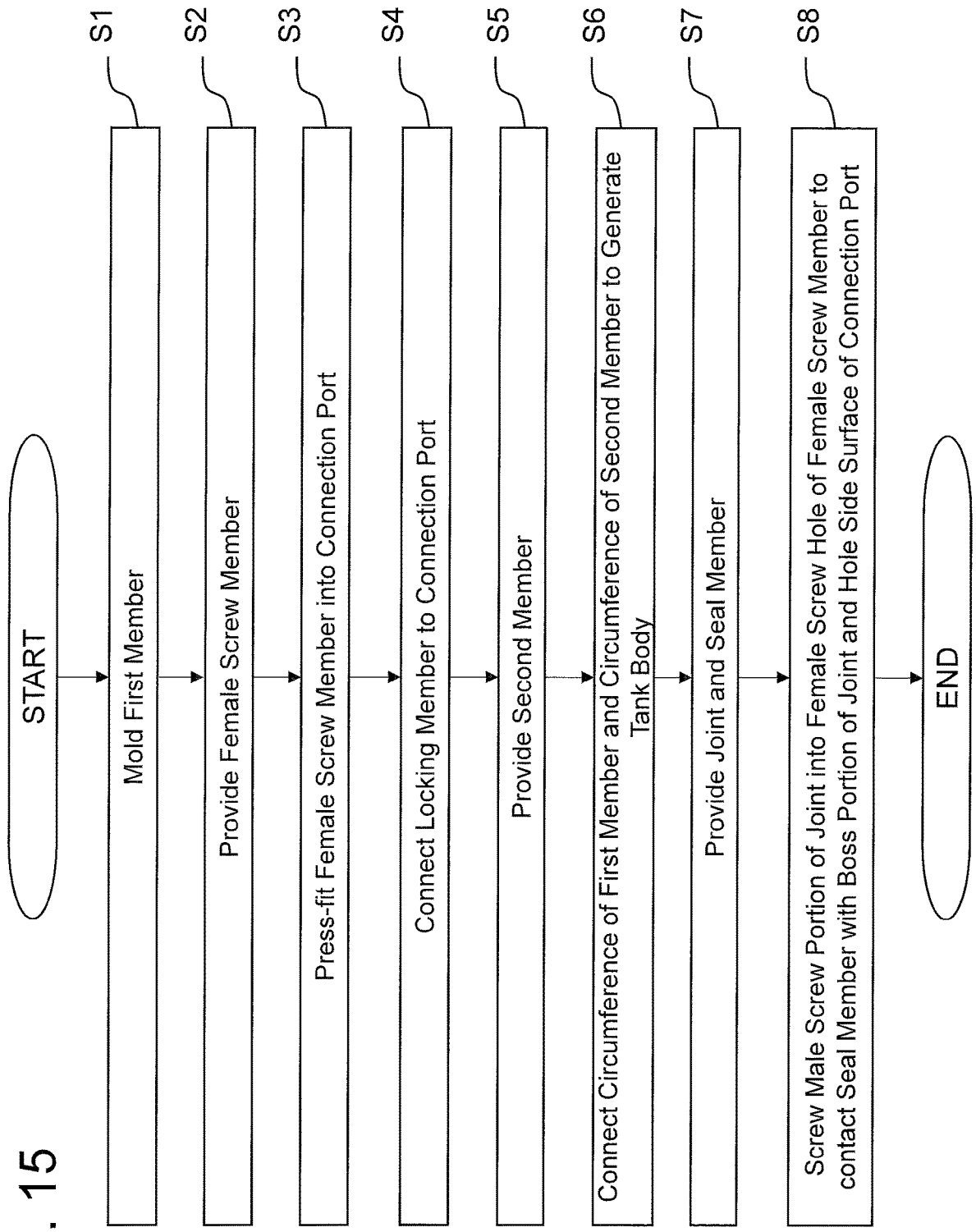
FIG. 15 is a flow chart of a method of manufacturing a tank.

FIG. 14 is a developed view of the tank 7. FIG. 15 is a flowchart of a method of manufacturing the tank 7. Referring to FIGS. 14 and 15, in the manufacturing method, in step S1, a first member 11 made of a thermoplastic resin including a tubular connection port 13 having a through hole 13H extending in a first direction (axial direction Da) and having a first length (D1: see FIG. 13) in diameter is formed. In step S2, the above-described female screw member 20 is prepared. In step S3, before the first member 11 is cooled and the contraction is completed, the female screw member 20 is press-fitted into the connection port 13 (refer to FIG. 13) so that the first outer surface 22 contacts the hole side surface 15HS (13HS) defining the through hole 13H. In step S4, the above-described locking member 50 is joined to the connection port 13 so as to contact the second bearing surface 24 of the female screw member 20 by vibration welding of the projecting portion 17 and the groove portion 53. In step S5, a second member 12 made of a thermoplastic resin having an outer periphery (joint surface 12a) corresponding to the outer periphery of the first member 11 (joint surface 11a) is prepared. Specifically, the second member 12 is formed. If the female screw member 20 or the locking member 50 is also attached to the second member 12 after step S5, steps S2 to S4 are performed on the second member 12 before the second member 12 is cooled and the contraction is completed.

In step S6, the outer periphery of the first member 11 (joint surface 11a) and the outer periphery of the second member 12 (joint surface 12a) are joined by vibration welding to form a tank body 10 including an inner space 18 for storing liquid surrounded by the first member 11 and the second member 12. In step S6, a joint 30 and a seal member 40 are provided, the joint 30 having a male screw portion 31 to be screwed into the female screw hole 61, a boss portion 33 connected to the male screw portion 31, and a joint through hole 39 passing through the male screw portion 31 and the boss portion 33, an outer diameter of the male screw portion 31 being a second length D2 smaller than the first length D1, an outer diameter of the boss portion 33 being a third length D3 larger than the second length D2 and smaller than the first length D1. In step S7, the male screw portion 31 is screwed into the female screw hole 61, so that the seal member 40 is brought into contact with the boss portion 33 and the hole side surface 14HS (13HS).

Operation and Effect of the Embodiment

The tank 7 according to the present embodiment includes a tank body 10 made of a thermoplastic resin, a metal female screw member 20, a metal joint 30, and a seal member 40. A tank body 10 has a tubular connection port 13 having a through hole 13H, and an inner space 18 communicating with the connection port 13 and storing a liquid. A female screw member 20 has a first inner surface 21 defining a female screw hole, a first outer surface 22 opposite to the first inner surface 21 in the radial direction (Dr) with respect to the center axis Ax of the female screw hole, and a first bearing surface 23 provided between the first inner surface 21 and the first outer surface 22 in the radial direction Dr, wherein the first outer surface 22 contacts a hole side surface 13HS defining a through hole 13H. The joint 30 has a male screw portion 31 to be screwed into a female screw hole 61, a boss portion 33 connected to the male screw portion 31, and a joint through hole 39 passing through the male screw portion 31 and the boss portion 33. The seal member 40 is provided so as to contact the boss portion 33 and the hole side surface 13HS when the male screw portion 31 is screwed into the female screw hole. The boss portion 33 can contact the first bearing surface 23 when the male screw portion 31 is screwed into the female screw hole.

Further, the manufacturing method of the tank 7 according to the present embodiment includes heating a first member 11 made of a thermoplastic resin that includes a tubular connection port 13 having the through hole 13H which extends in the first direction (axial direction Da) and has a first length of a diameter D1. The female screw member 20 including first inner surface 21 defining the female screw hole, a first outer surface 22 opposite to a first inner surface 21 in a radial direction Dr with respect to the center axis Ax of the female screw hole, a first bearing surface 23 provided between the first inner surface 21 and the first outer surface 22 in the radial direction Dr, and a second bearing surface 24 connecting the first inner surface 21 and the first outer surface 22 opposite to the first bearing surface 23 is press-fitted so that the first outer surface 22 contacts a hole side surface 13HS defining a through hole 13H. A second member 12 made of a thermoplastic resin having an outer circumference (joint surface 12a) corresponding to the outer circumference (joint surface (11a)) of the first member 11 is heated. The outer periphery of the first member 11 (joint surface 11a) and the outer periphery of the second member 12 (joint surface 12a) are welded to form an inner space 18 for storing liquid, which is surrounded by the first member 11 and the second member 12. The first member 11 and the second member 12 are cooled to form a tank body 10 composed of the first member 11 and the second member 12. Provided are a joint 30 and a seal member 40 having a male screw portion 31 having an outer diameter of a second length D2 that is smaller than a first length D1 and to be screwed into a female screw hole 61, a boss portion 33 having an outer diameter of a third length (D3) that is larger than the second length D2 and smaller than the first length D1 and connected to the male screw portion 31, and a joint through hole 39 passing through the male screw portion 31 and the boss portion 33. By screwing the male screw portion 31 into the female screw hole, the seal member 40 is brought into contact with the boss portion 33 and the hole side surface 13HS.

Therefore, since only the female screw member 20 and the joint 30 are required to be connected to the tank body 10 made of the thermoplastic resin, the joint structure can be realized with a simple structure. Further, since the male screw portion 31 can be brought into contact with the first bearing surface 23 when the male screw portion 31 is screwed into the female screw hole, it is easy for the operator to recognize whether the joint 30 is sufficiently fastened to the female screw member 20. Further, the resin supporting the joint 30 and the female screw member 20 is not deformed. Further, since the seal member 40 is provided so as to be in contact with the boss portion 33 and the hole side surface 13HS, the degree of collapse of the seal member 40 is constant regardless of the degree of fastening of the joint 30 and the female screw member 20, thereby improving the durability of the seal member 40.

Variations of the Embodiments

Figure 16:
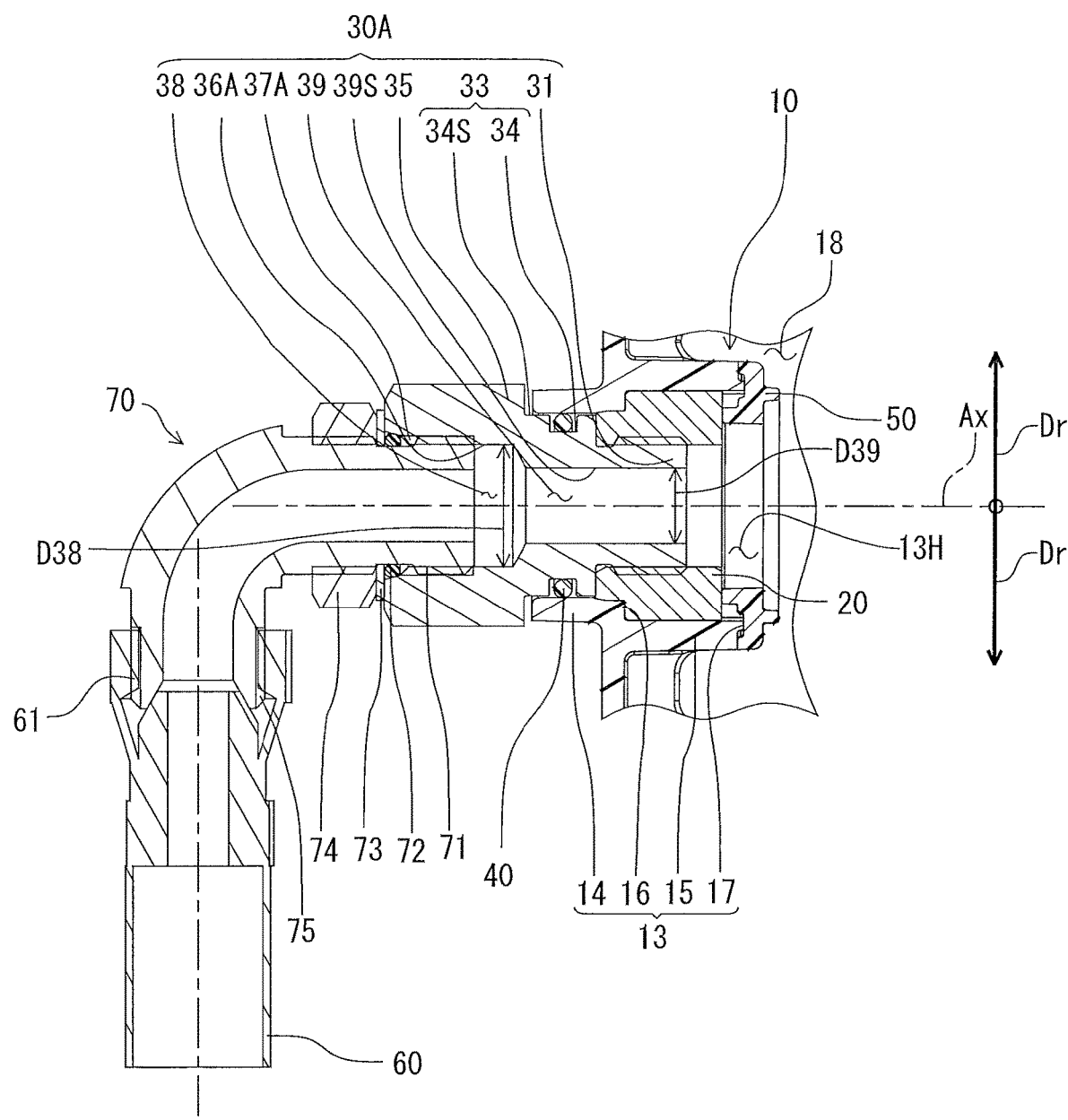
FIG. 16 shows a variation of the joint.

The structure of the hose connection 36 described in the above embodiment is not limited to the structure shown in the embodiment. There are various structures for connecting the hose 60 to the joint 30, and the structure of the hose connection 36 may be changed corresponding to the structure of the hose 60. Also, the structure of the head portion 35 may be changed for the convenience of mounting the joint 30. FIG. 16 shows an example in which these structures are modified. FIG. 16 shows a variation 30A of the joint 30. In FIG. 16, since only the addition of the additional joint 70 between the joint 30 and the hose 60 is changed from the configuration shown in FIG. 5, the other configurations are denoted by the same reference numerals and the detailed description thereof will be omitted.

In FIG. 16, in the joint 30A, the hose connection 36S is formed inside the head portion 35 in the radial direction Dr. The hose connection 36S forms an additional joint through hole 38. In other words, the head portion 35 further includes an additional joint through hole 38 extending in the axial direction Da and communicating with the joint through hole 39. The diameter D38 of the additional joint through hole 38 in the radial direction Dr is longer than the diameter D39 of the joint through hole 39 in the radial direction Dr. The hose connection 36S forms an additional female screw portion 37A. The additional joint 70 has a male screw portion 71, and by screwing the male screw portion 71 into the additional female screw portion 37A, the additional joint 70 and the joint 30A are coupled. In order to prevent oil leakage, an additional seal member 72 (for example, an O-ring) is further inserted into the additional joint through hole 38, and a washer 73 and a nut 74 are provided to prevent the additional seal member 72 from coming off. The additional joint 70 has a male screw portion 75 having the same configuration as the additional male screw portion 37 at an end opposite to the male screw portion 71. A female screw hole 61 of the hose 60 is screwed into the male screw portion 75.

As used herein, "comprising" and its derivatives are non-limiting terms that describe the presence of a component, and do not exclude the presence of other components not described. This also applies to "having", "including" and their derivatives.

The terms "member," "part," "element," "body," and "structure" may have multiple meanings, such as a single part or multiple parts.

Ordinal numbers such as "first" and "second" are simply terms used to identify configurations and do not have other meanings (e.g., a particular order). For example, the presence of the "first element" does not imply the presence of the "second element", and the presence of the "second element" does not imply the presence of the "first element".

Terms such as "substantially", "about", and "approximately" indicating degrees can mean reasonable deviations such that the final result is not significantly altered, unless otherwise stated in the embodiments. All numerical values described herein may be interpreted to include words such as "substantially," "about," and "approximately."

In the present application, the phrase "at least one of A and B" should be interpreted to include only A, only B, and both A and B.

In view of the above disclosure, it will be apparent that various changes and modifications of the present invention are possible. Therefore, the present invention may be carried out by a method different from the specific disclosure of the present application without departing from the spirit of the present invention.

What is claimed is:

1. A tank comprising:
a tank body made of a thermoplastic resin and comprising:
an external wall defining an inner space; and
a connection port connected to the external wall and having a tubular shape with a through hole communicating with the inner space;
a female screw member made of metal and comprising:
a first inner side surface defining a female screw hole;
a first outer side surface opposite to the first inner side surface in a radial direction with respect to a center axis of the female screw hole; and
a first bearing surface provided between the first inner side surface and the first outer side surface in the radial direction, the first outer side surface being configured to contact a hole side surface defining the through hole;
a joint made of metal and comprising:
a male screw portion to be screwed into the female screw hole;
a boss portion connected to the male screw portion; and
a joint through hole which passes through the male screw portion and the boss portion; and
a seal member to contact the boss portion and the hole side surface when the male screw portion is screwed into the female screw hole, the boss portion being contactable with the first bearing surface when the male screw portion is screwed into the female screw hole,
wherein the connection port includes an internal projection projecting from the external wall into the inner space and an external projection projecting from the external wall opposite to the inner space to define the through hole.

2. The tank according to claim 1, wherein
the boss portion of the joint has a retaining groove on a second outer side surface opposite to a second inner side surface defining the joint through hole, and
the seal member is provided in the retaining groove.

3. The tank according to claim 2, wherein
the joint through hole and the through hole extend in an axial direction along the center axis; and
an outer diameter of the boss portion in the radial direction is longer than an outer diameter of the male screw portion in the radial direction.

4. The tank according to claim 3, wherein
a diameter of the through hole in the radial direction between the female screw member and the boss portion is longer than the outer diameter of the boss portion.

5. The tank according to claim 4, wherein
the joint further includes a head portion opposite to the male screw portion with respect to the boss portion in the axial direction, and
an outer diameter of the head portion in the radial direction is longer than the outer diameter of the boss portion.

6. The tank according to claim 1, wherein
a periphery of the female screw member as viewed in the axial direction has a polygonal shape.

7. The tank according to claim 1, wherein
the connection port has a first end facing the inner space and a second end facing the outside of the tank body and opposite to the first end,
the female screw member is closer to the first end than to the second end, and
the seal member is closer to the second end than to the first end.

8. The tank according to claim 1, wherein
the tank body is made of nylon with tempered glass.

9. The tank according to claim 1, wherein
the seal member is an O-ring.

10. A work vehicle comprising the tank according to claim 1.

11. The tank according to claim 1, wherein
the joint through hole and the through hole extend in an axial direction along the center axis; and
an outer diameter of the boss portion in the radial direction is longer than an outer diameter of the male screw portion in the radial direction.

12. The tank according to claim 11, wherein
a diameter of the through hole in the radial direction between the female screw member and the boss portion is longer than the outer diameter of the boss portion.

13. The tank according to claim 12, wherein
the joint further includes a head portion opposite to the male screw portion with respect to the boss portion in the axial direction, and
an outer diameter of the head portion in the radial direction is longer than the outer diameter of the boss portion.

14. The tank according to claim 11, wherein
the joint further includes a head portion opposite to the male screw portion with respect to the boss portion in the axial direction, and
an outer diameter of the head portion in the radial direction is longer than the outer diameter of the boss portion.

15. The tank according to claim 14, wherein
a periphery of the head portion as viewed in the axial direction has a regular hexagonal shape.

16. The tank according to claim 14, wherein
the joint includes a hose connection configured to be connected to a hose, and
the hose connection is provided opposite to the boss portion with respect to the head portion in the axial direction or inside of the head portion in the radial direction.

17. A tank comprising:
a tank body made of a thermoplastic resin and comprising:
    an external wall defining an inner space; and
    a connection port connected to the external wall and having a tubular shape with a through hole communicating with the inner space;
a female screw member made of metal and comprising:
    a first inner side surface defining a female screw hole;
    a first outer side surface opposite to the first inner side surface in a radial direction with respect to a center axis of the female screw hole; and
    a first bearing surface provided between the first inner side surface and the first outer side surface in the radial direction, the first outer side surface being configured to contact a hole side surface defining the through hole;
a joint made of metal and comprising:
    a male screw portion to be screwed into the female screw hole;
    a boss portion connected to the male screw portion; and
    a joint through hole which passes through the male screw portion and the boss portion; and
a seal member to contact the boss portion and the hole side surface when the male screw portion is screwed into the female screw hole, the boss portion being contactable with the first bearing surface when the male screw portion is screwed into the female screw hole,
wherein the boss portion of the joint has a retaining groove on a second outer side surface opposite to a second inner side surface defining the joint through hole and the seal member is provided in the retaining groove,
wherein the joint through hole and the through hole extend in an axial direction along the center axis and an outer diameter of the boss portion in the radial direction is longer than an outer diameter of the male screw portion in the radial direction,
wherein a diameter of the through hole in the radial direction between the female screw member and the boss portion is longer than the outer diameter of the boss portion,
wherein the joint further includes a head portion opposite to the male screw portion with respect to the boss portion in the axial direction, and an outer diameter of the head portion in the radial direction is longer than the outer diameter of the boss portion,
wherein a periphery of the head portion as viewed in the axial direction has a regular hex agonal shape,
wherein the joint includes a hose connection configured to be connected to a hose, and the hose connection is provided opposite to the boss portion with respect to the head portion in the axial direction or inside of the head portion in the radial direction,
wherein a periphery of the female screw member as viewed in the axial direction has a polygonal shape, and
wherein the connection port includes an internal projection projecting from the external wall into the inner space and an external projection projecting from the external wall opposite to the inner space to define the through hole.

18. A tank comprising:
a tank body made of a thermoplastic resin and comprising:
    a connection port having a tubular shape with a through hole; and
    an inner space communicating with the connection port;
a female screw member made of metal and comprising:
    a first inner side surface defining a female screw hole;
    a first outer side surface opposite to the first inner side surface in a radial direction with respect to a center axis of the female screw hole; and
    a first bearing surface provided between the first inner side surface and the first outer side surface in the radial direction, the first outer side surface being configured to contact a hole side surface defining the through hole;
a joint made of metal and comprising:
    a male screw portion to be screwed into the female screw hole;
    a boss portion connected to the male screw portion; and
    a joint through hole which passes through the male screw portion and the boss portion;
a seal member to contact the boss portion and the hole side surface when the male screw portion is screwed into the female screw hole, the boss portion being contactable with the first bearing surface when the male screw portion is screwed into the female screw hole; and
a locking member connected to the connection port, wherein the female screw member further has a second bearing surface connecting the first inner side surface and the first outer side surface opposite to the first bearing surface in an axial direction along the center axis, and the locking member contacts the second bearing surface.

19. A method of manufacturing a tank for a work vehicle, comprising:
- molding a first member made of a thermoplastic resin and including a connection port having a tubular shape with a through hole extending in a first direction and having a first length in diameter;
- providing a female screw member having: a first inner side surface defining a female screw hole; a first outer side surface opposite to the first inner side surface in a radial direction with respect to a center axis of the female screw hole; a first bearing surface provided between the first inner side surface and the first outer side surface in the radial direction; and a second bearing surface connecting the first inner side surface and the first outer side surface opposite to the first bearing surface;
- press-fitting the female screw member into the connection port so that the first outer side surface comes into contact with a hole side surface defining the through hole before the first member is cooled;
- providing a second member made of a thermoplastic resin and having a periphery corresponding to the periphery of the first member;
- connecting the periphery of the first member and the periphery of the second member to generate a tank body having an inner space to store liquid, the inner space being surrounded by the first member and the second member;
- providing a joint and a seal member, the joint having a male screw portion to be screwed into the female screw hole, a boss portion connected to the male screw portion, and a joint through hole passing through the male screw portion and the boss portion, an outer diameter of the male screw portion being a second length smaller than the first length, an outer diameter of the boss portion being a third length larger than the second length and smaller than the first length; and
- screwing the male screw portion into the female screw hole to contact the seal member with the boss portion and the hole side surface.

20. The method of manufacturing according to claim 19, further comprising:
- connecting a locking member to the connection port so as to contact the second bearing surface before the periphery of the first member and the periphery of the second member are connected to each other after the female screw member is press-fitted in contact with the hole side surface.

* * * * *